US006918622B2

(12) United States Patent
Kim et al.

(10) Patent No.: US 6,918,622 B2
(45) Date of Patent: Jul. 19, 2005

(54) ROBOT HAND AND ROBOT HAND FINGER

(75) Inventors: Mun-Sang Kim, Seoul (KR);
Bong-Soo Kang, Seongnam (KR);
Woo-Jin Chung, Seoul (KR);
Hyung-Jin Lee, Incheon (KR);
Chong-Won Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 125 days.

(21) Appl. No.: 10/288,954

(22) Filed: Nov. 6, 2002

(65) Prior Publication Data

US 2003/0090115 A1 May 15, 2003

(30) Foreign Application Priority Data

Nov. 9, 2001 (KR) ................................ 10-2001-0069841

(51) Int. Cl.$^7$ ................................................. B25J 15/02
(52) U.S. Cl. ..................... 294/106; 294/907; 901/34; 901/38
(58) Field of Search .......................... 294/106, 88, 907; 901/31–34, 36–39, 46; 623/57, 64; 414/1, 4

(56) References Cited

U.S. PATENT DOCUMENTS

| 3,370,213 | A | * | 2/1968 | Glenn | ........................ 318/513 |
| 4,246,661 | A | * | 1/1981 | Pinson | ........................ 623/25 |
| 4,364,593 | A | * | 12/1982 | Maeda | ........................ 294/106 |
| 4,600,357 | A | * | 7/1986 | Coules | ........................ 414/730 |
| 4,834,443 | A | * | 5/1989 | Crowder et al. | ............ 294/106 |
| 4,957,320 | A | | 9/1990 | Ulrich | |
| 4,984,951 | A | * | 1/1991 | Jameson | ........................ 414/1 |
| 5,108,140 | A | | 4/1992 | Bartholet | |
| 5,762,390 | A | | 6/1998 | Gosselin et al. | |
| 6,517,132 | B2 | * | 2/2003 | Matsuda et al. | ............ 294/106 |

FOREIGN PATENT DOCUMENTS

| JP | 52-101567 | 8/1977 |
| JP | 11-245187 | 9/1999 |

OTHER PUBLICATIONS

Woojin Chung, et al., "Design and Control of Dexterous Multi–Fingered Robot Hand", Oct. 20, 2001, 4 pages.
Li–Ren Lin, et al., "Mechanism Design of a New Multifingered Robot Hand", Apr. 1996, 6 pages—p. 1471 to p. 1476.
Gongliang Guo, et al., "A New Design for a Dextrous Robotic Hand mechanism", Aug. 1992, 4 pages—p. 35 to p. 38.
S.C. Jacobsen, et al., "Dextrous Hand: Work in Progress", 1984, 30 pages—p. 21 to p. 50.
Thierry Laliberte, et al., "Simulation and Design of Underactuated Mechanical Hands", Feb. 1996, 19 pages—p. 39 to p. 57.
Shigeo Hirose, "The Development of Soft Gripper for the Versatile Robot Hand", Oct. 24, 1977, 9 pages.
Shugen Ma, et al. "Design and Experiments for a Coupled Tendon–Driven Manipulator", Feb. 1993, 7 pages—p. 30 to p. 36.
"Coupled Tendon–Driven Arm, CT Arm–I",1990–1993, 2 pages; and.
"MCB—Industrial Robot Feature Article", 2000, 28 pages.

* cited by examiner

Primary Examiner—Dean J. Kramer
(74) Attorney, Agent, or Firm—Scully, Scott, Murphy & Presser

(57) ABSTRACT

A robot hand finger makes a hooking movement similar to that of the human fingers with less number of driving units by installing a 4-joint link. A robot hand includes several fingers and 4-joint link in order to implement a horizontal movement of the fingers. A robot hand selectively drives a hooking movement and a horizontal movement of fingers with less number of driving units by having a clutch unit. A robot hand includes fingers with a strain gage and is able to control a grasping force by using a value measured by the strain gage.

16 Claims, 13 Drawing Sheets

ROBOT HAND AND ROBOT HAND FINGER

BACKGROUND OF THE INVENTION

1. Field of the Invention

The present invention relates to a robot hand and a robot hand finger and, more particularly, to a robot hand finger that is capable of hooking and a hand that is capable of grasping a stuff stably by having the hooking-available robot hand finger.

2. Description of the Background Art

FIG. 1 is a plan view of a a multi-articular robot hand in accordance with a conventional art, and FIG. 2 is a side view showing an operation state of the robot hand of FIG. 1.

The conventional robot hand includes a thumb 20A, a forefinger 20B, middle finger 20C, third finger 20D and a little finger 20E in combination with a bracket 42 attached at front portion of an arm 41 of an industrial robot.

The thumb 20A is formed by connecting three phalanxes 25–27 to two axes 34–35.

The forefinger 20B, the middle finger 20C, the third finger 20D and the little finger 20E are formed by connecting four phalanxes 21–24 to three axes 31–33.

A pneumatic cylinder 43 is installed inside each of the phalanxes 21–24 and 26 of fingers 20A–20E, and a vertical guide hole 45 is formed at a front end of a piston rod 44.

A pair of protrusions 46 are formed facing each other at a distal end of phalanxes 22–24, 26–27 except the distal phalanx 21 and 25 of the fingers 20A–20E, and a diagonal cam hole 47 and an axial hole 51 are formed at the protrusion 46.

A pair of support protrusions 48 are formed facing each other at a proximal end of the phalanxes 21–23 and 25–26 except the proximal phalanxes 24 and 27 of the fingers 20A–20E, and an axial hole 49 a long hole 50 are formed at the support protrusion 48.

The protrusion 46 is inserted between the support protrusions 48, and a central piece 52 is inserted penetrating the axial holes 49 and 51 so that the phalanx can be rotated.

A support pin 53 is installed penetrating the long hole 50, the vertical guide hole 45 of the piston rod 44 and the cam hole 47, so as to make a hooking movement. Air injection ports 54 and 55 are formed at the pneumatic cylinder 43.

As shown in FIGS. 1 and 2, the robot hand can make a hooking movement with the axis portions 31–35 by the pneumatic pressure supplied to each pneumatic cylinder 43 under the control of a separately installed controller (not shown).

The operation of the conventional multi-articular robot hand constructed as described above will now be described.

When air is supplied to the air injection port 54 of the pneumatic cylinder 43 by the controller (not shown), the piston rod 44 is moved forwardly, the support pin 53 is guided to be downwardly moved by the cam hole 47, and the phalanx 22 makes an upward hooking movement centering around the central pin 52.

When air is supplied to the other air injection port 55 of the pneumatic cylinder 43, the phalanx is unfolded as the above process is reversely performed.

In order to make the fingers 20A–20E to move, the conventional multi-articular robot hand needs the pneumatic cylinder 43 as many as the axes 31–35, resulting in that the construction elements of the robot hand is increased in number and its volume is enlarged.

In addition, the fingers 20A–20E are disposed in a straight line and can not make a horizontal movement. Thus, if a working stuff has a circular form, the fingers can hardly grasp it.

Moreover, a grasping force of the hand is to be changed suitably and actively depending on the working stuff to be grasped so as to stably grasp the working stuff and prevent a damage. But the conventional robot hand fails to suitably and actively change the grasping force of the hand according to the working stuff.

SUMMARY OF THE INVENTION

Therefore, an object of the present invention is to provide a robot hand finger that is capable of making a movement such as an actual hand movement by forming a link structure to allow the robot hand finger to make a horizontal movement.

Another object of the present invention is to provide a robot hand finger with the reduced number of driving units to move the fingers by installing a clutch device.

Still another object of the present invention is to provide a robot hand finger that is capable of suitably and actively controlling a grasping force of a hand by installing a strain gage to measure an actual force working on the hand.

Yet another object of the present invention is to provide a robot hand finger that is capable of making a hooking movement just like an actual hand movement with the small number of driving units by having a link structure for phalanxes of the robot hand finger.

To achieve these and other advantages and in accordance with the purpose of the present invention, as embodied and broadly described herein, there is provided a robot hand including: a robot hand base portion; a moving finger installed at the side of the hand base portion; first and second horizontal moving guide installed facing each other, of which one end is hinge-coupled at the hand base portion and the other end is hinge-coupled at the moving finger, so as to form parallelogram 4-joint link structure to force the moving finger to move in the side direction of the moving finger; and a horizontal moving unit for making the horizontal moving guide to be rotated on the basis of a shaft hinge-coupled at the hand base portion.

In such manner, the link structure is formed to enable the robot hand finger to make a horizontal movement, so that it can be moved just like an actual hand movement.

To achieve the above objects, there is also provided a robot hand including: a robot hand base portion; a moving finger installed at the side of the hand base portion; first and second horizontal moving guide installed facing each other, of which one end is hinge-coupled at the hand base portion and the other end is hinge-coupled at the moving finger, so as to form parallelogram 4-joint link structure to force the moving finger to move in the side direction of the moving finger; a second driving motor for making the horizontal moving guide to be rotated on the basis of a shaft hinge-coupled at the hand base portion; a horizontal movement driving force transferring unit installed between the second driving motor and the horizontal moving guide so as for the horizontal moving guide to be rotated by using a driving force of the second driving motor; a moving finger hooking unit to allow the moving finger to make a hooking movement; a fixed finger having a first phalanx fixed at the side of the hand base portion and a second phalanx hinge-coupled at the end of the first phalanx by a first joint; a fixed finger hooking unit installed between the second driving motor and the fixed finger to allow the fixed finger to make a hooking movement by using the driving force of the second driving motor; and a clutch unit selectively transferring the driving force of the second driving motor to one of the horizontal movement driving force transferring unit and the fixed finger hooking unit by the hooking movement of the moving finger.

Accordingly, by having the clutch unit, the number of driving units for moving the robot hand finger can be reduced.

Preferably, the robot hand includes: a strain gage installed at the moving finger and the fixed finger; a calculator for calculating a strength of a force applied to the finger by measuring a voltage value from the stain gage; and a controller for controlling the first driving motor and the second driving motor by using the strength of the force calculated by the calculator.

Accordingly, the grasping force of the hand can be suitably and actively controlled by measuring the force working on the robot hand.

To achieve the above object s, there is also provided a robot hand finger including: first phalanx; second phalanx hinge-coupled at the distal end of the first phalanx by a first axis; third phalanx of which one end is hinge-coupled with the distal end of the second phalanx by a second axis; an auxiliary link of which one end is hinge-coupled with the first phalanx so as to cross a straight line connecting the first axis and the second axis and the other end is hinge-coupled with the third phalanx, in order to construct a 4-joint link forcing the third phalanx to be dependent to a rotational movement of the second phalanx in its moving; and a finger hooking unit for making the second phalanx to be moved centering around the first phalanx.

Accordingly, by forming the link structure for the phalanxes of the robot hand finger, the hooking movement just like an actual hand movement can be possibly performed with the less number of driving units.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5 through 7 show sequential steps of operation of the moving finger of FIG. 4, of which FIG. 5 is a side view of the moving finger in a state of being hooked;

FIG. 6 is a side view of the moving finger in a state of being unfolded; and

FIG. 7 is a side view of the moving finger in a state of being bent back;

FIGS. 15 and 16 illustrate the structure of a robot hand in accordance with another embodiment of the present invention, of which FIG. 15 is a plan view of the robot hand; and FIG. 16 is a plan view of the robot hand of FIG. 15 in a state of being unfolded;

FIGS. 17 and 18 illustrate the structure of a robot hand in accordance with still another embodiment of the present invention, of which FIG. 17 is a plan view of the robot hand; and FIG. 18 is a plan view of the robot hand of FIG. 17 in a state of being unfolded.

DETAILED DESCRIPTION OF THE PREFERRED EMBODIMENTS

Reference will now be made in detail to the preferred embodiments of the present invention, examples of which are illustrated in the accompanying drawings.

Figure 1:
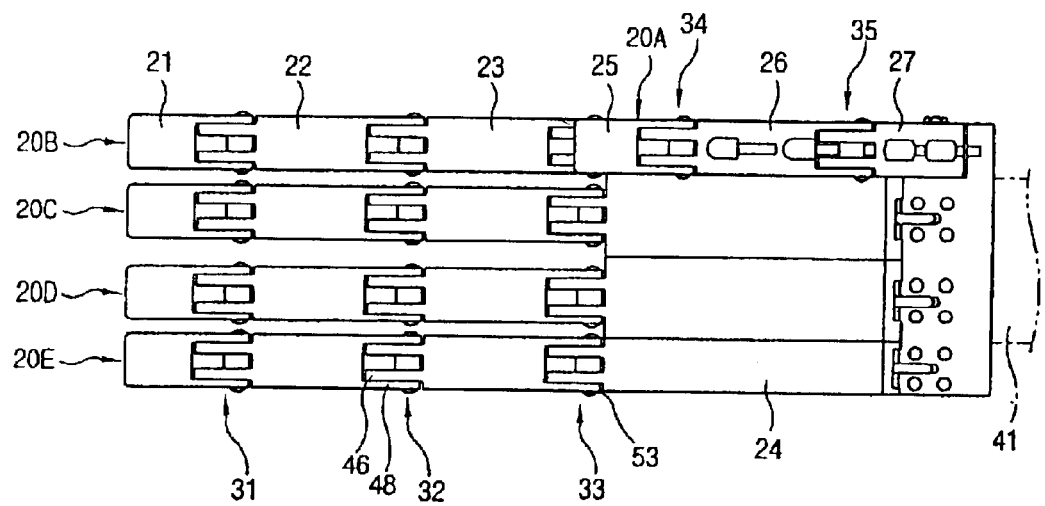
FIG. 1 is a plan view of a multi-articular robot hand in accordance with a conventional art.
Figure 2:
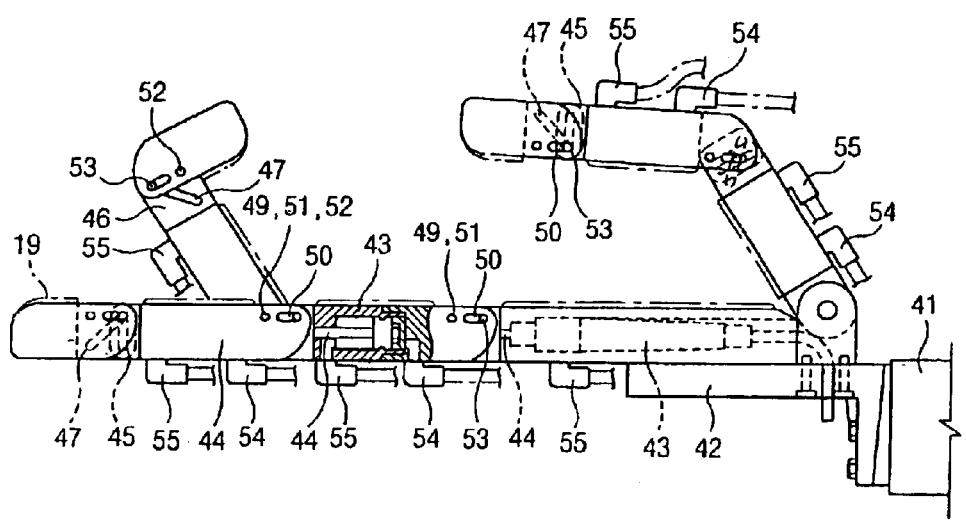
FIG. 2 is a side view of a hand of FIG. 1.
Figure 3:
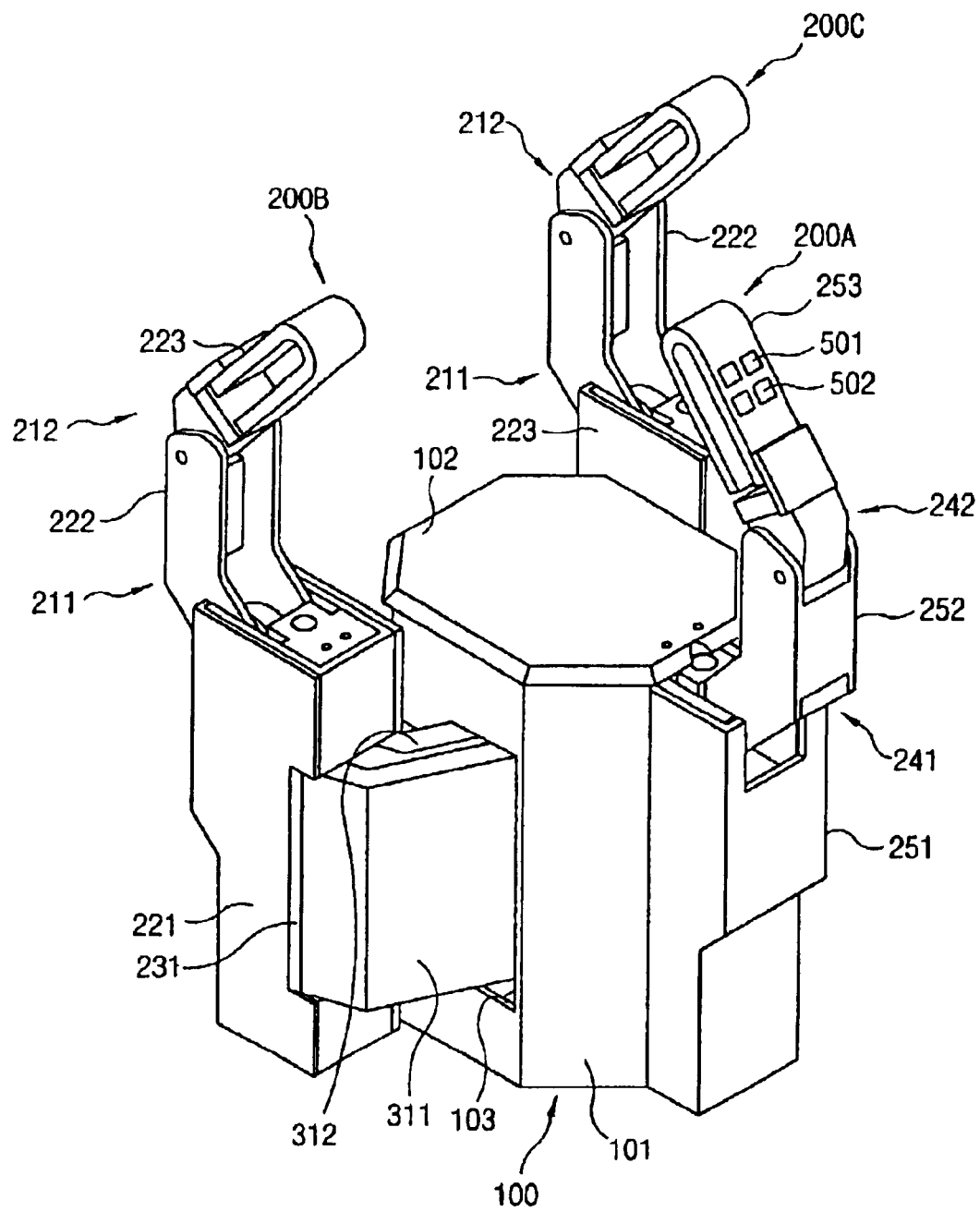
FIG. 3 is a perspective view of a robot hand in accordance with one embodiment of the present invention.

FIG. 3 is a perspective view of a robot hand in accordance with one embodiment of the present invention.

A robot hand of the present invention includes: a hand base portion 100 in a pillar shape; moving fingers 200b and 200c installed at the side of the hand base portion 100; a fixed finger 200A installed at the side 101 of the hand base portion 100 and making only a hooking movement; horizontal moving guides 311 and 312 of which one end is hinge-coupled with the moving fingers 200B and 200C and the other end is hinge-coupled at the hand base portion 100; and a horizontal moving unit for making the horizontal moving guides 311 and 312 to be rotated on the basis of the axis hinge-coupled with the hand base portion 100.

The hand base portion 100 consists of a side plate 101 octagonal pillared side plate 101 and an upper plate 102 covering the upper side of the side plate 101. An opening 103 is formed at the side plate 101 where the moving fingers 200B and 200C are installed, into which the horizontal moving guides 311 and 312 are inserted.

The robot hand fingers 200A–200C includes more than one phalanx, consisting of the moving fingers 200B and 200C that are able to make a hooking movement and a horizontal movement, and a fixed finger 200A that is able to make only a hooking movement.

The fixed finger 200A serves as a thumb. The first phalanx 251 of the fixed finger is fixed at the side 101 of the hand base portion 100 so that it can only make a hooking movement. The moving fingers 200B and 200C, serving as other fingers (i.e., the forefinger and the third finger, etc.), are connected to the hand base portion 100 through the horizontal moving guides 311 and 312 so as to make the horizontal movement as well as the hooking movement.

The robot hand fingers 200A–200C include, respectively, first phalanxes 221 and 251 installed at the side of the hand base portion 100; second phalanxes 222 and 252 of which one ends are hinge-coupled at the distal ends of the first phalanxes 221 and 251; third phalanxes 223 and 253 of which one ends are hinge-coupled at the distal ends of the second phalanxes 222 and 252; first axes 211 and 241 for hinge-coupling the first phalanxes 221 and 251 and the second phalanxes 222 and 252; and second axes 212 and 242 for hinge-coupling the second phalanxes 222 and 252 and the third phalanxes 223 and 253.

The robot hand includes strain gages 501 and 502 on the third phalanxes 223 and 253 of the fingers 200A–200C (that is, at the opposite side of grasping an object).

The first phalanx 221 of the moving finger includes an opening 231 at the side facing the hand base portion 100, into which the horizontal moving guides 311 and 312 can be inserted.

The moving fingers 200B and 200C are symmetrically disposed so that they can make a symmetrical horizontal movement.

Figure 4:
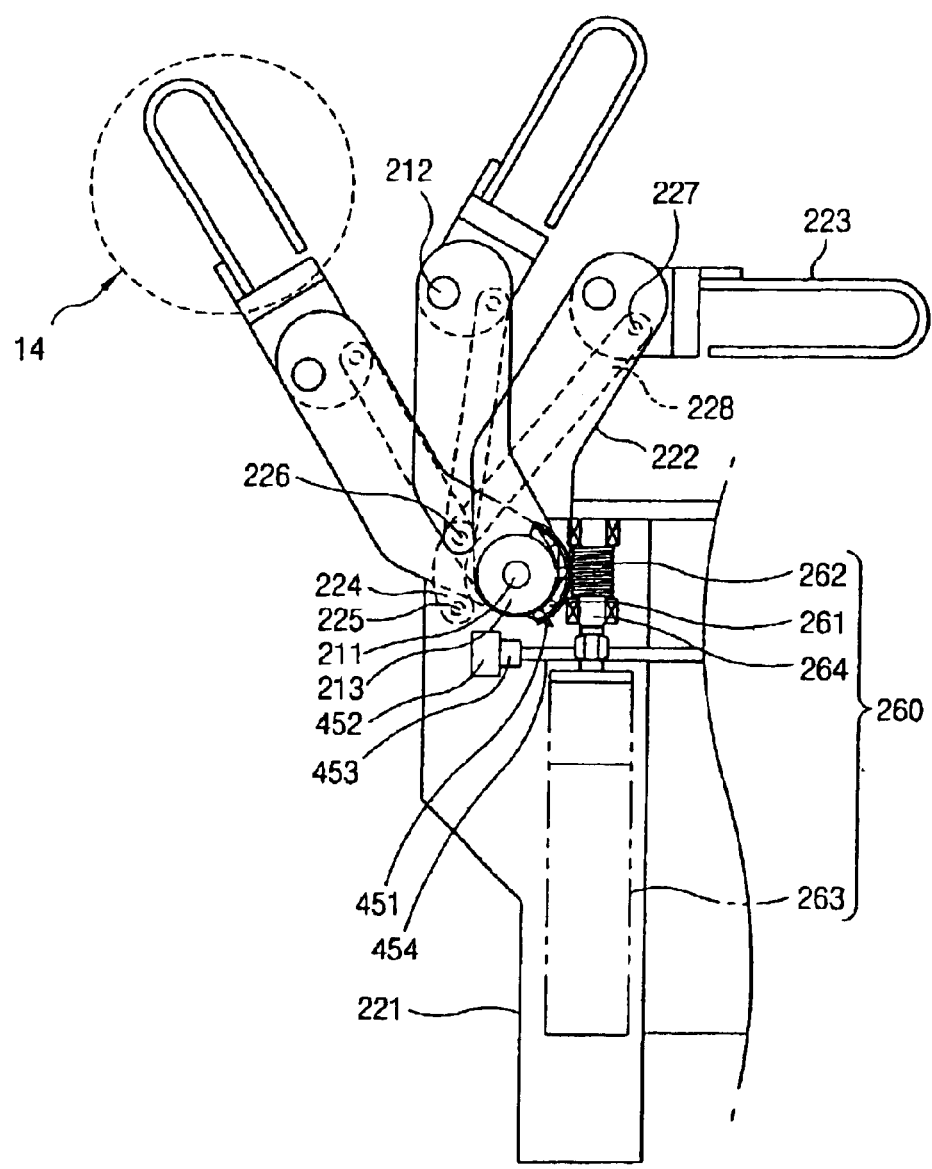
FIG. 4 is a side view of a moving finger of FIG. 3.

FIG. 4 is a side view of a moving finger of FIG. 3.

The moving finger 200B includes an auxiliary link 228 of which one end is hinge-coupled with the first phalanx 221 and the other end is hinge-coupled with the third phalanx 223 so as to construct a 4-joint link that forces the third phalanx 223 to be moved dependent on the rotational movement of the second phalanx 222, and a moving finger hooking unit 260 for making the moving finger 200B to make a hooking movement.

The auxiliary link 228 is installed to cross a straight line connecting the first axes 211 and the second axes 212.

Preferably, a connector 224 is provided of which one end is fixed at the first phalanx 221 and the other end is hinge-coupled with the auxiliary link 228, for facilitating installation of the auxiliary link 228.

The moving finger hooking unit 260 includes a bending worm gear 261 formed at the second phalanx 222, a bending worm 262 moved in mesh with the bending worm gear 261, and a first driving motor 263 for driving the bending worm 262.

The bending worm gear 261 is formed to cover the first axes 211, and the bending worm 262 is fixed at a driving shaft 264 of the first driving motor.

A cam engaging jaw 451, a cam follower 452, a fixing member 453 and a wire guide 454 as shown in FIG. 4 are to be described.

Figure 5:
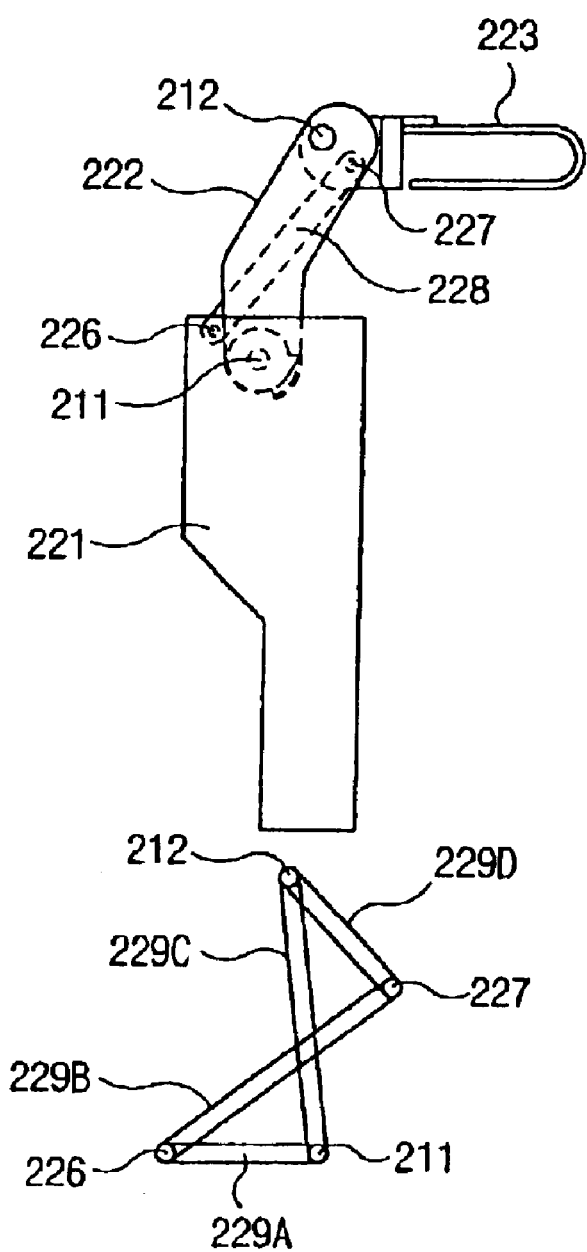
Figure 6:
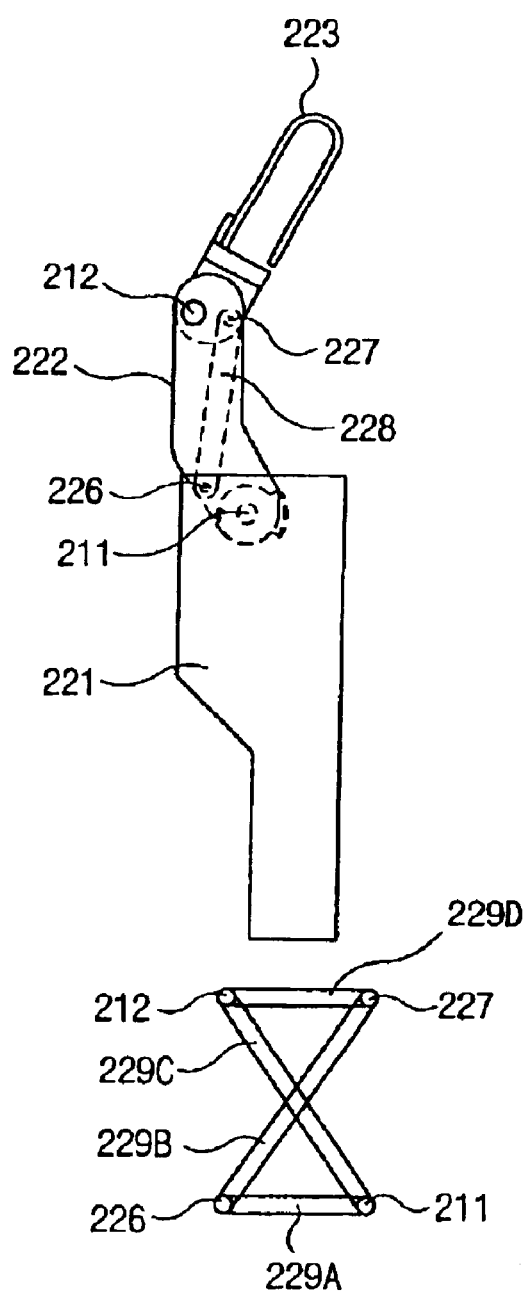
Figure 7:
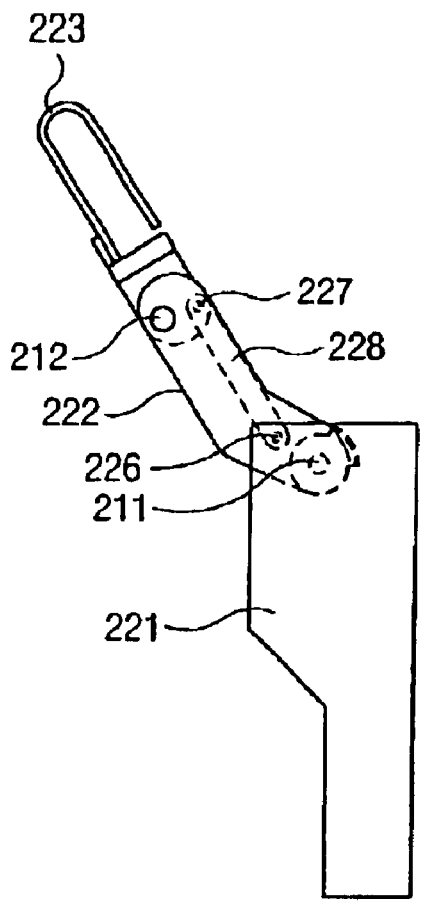
Figure 7:
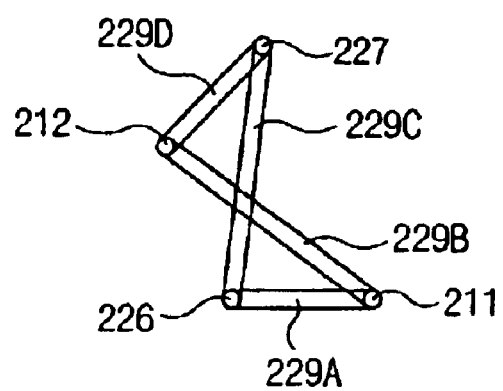

FIGS. 5 through 7 show sequential steps of operation of the moving finger of FIG. 4, of which FIG. 5 is a side view of the moving finger in a state of being hooked, FIG. 6 is a side view of the moving finger in a state of being unfolded, and FIG. 7 is a side view of the moving finger in a state of being bent back.

As shown in FIGS. 5 through 7, the second phalanx 222, the third phalanx 223, the first phalanx 221 and the auxiliary link 228 forms a 4-joint link structure. Accordingly, when the driving force of the first driving motor 263 rotates the second phalanx 222 through the bending warm 262 and the bending worm gear 261, the third phalanx 223 is dependent on the second phalanx 222 according to the operation of the 4-joint link structure, so that the robot hand finger makes a hooking movement at a predetermined angle.

The 4-joint link includes a first link 229A formed by the first axis 211 and the hinge axis 226 at the side of the first phalanx 221 of the auxiliary link 228, a second link 229B formed by the auxiliary link 228, a third link 229C formed by the second phalanx 222, and a fourth link 229D formed by the second axis 212 and a hinge axis 227 at the side of the third phalanx 223 of the auxiliary link 228.

The first link 229A is fixed, and when the third link 229C is rotated by the first driving motor 263, the fourth link 229D is dependently rotated, so that the third phalanx 223 is rotated dependently on the rotational movement of the second phalanx 222.

Figure 8:
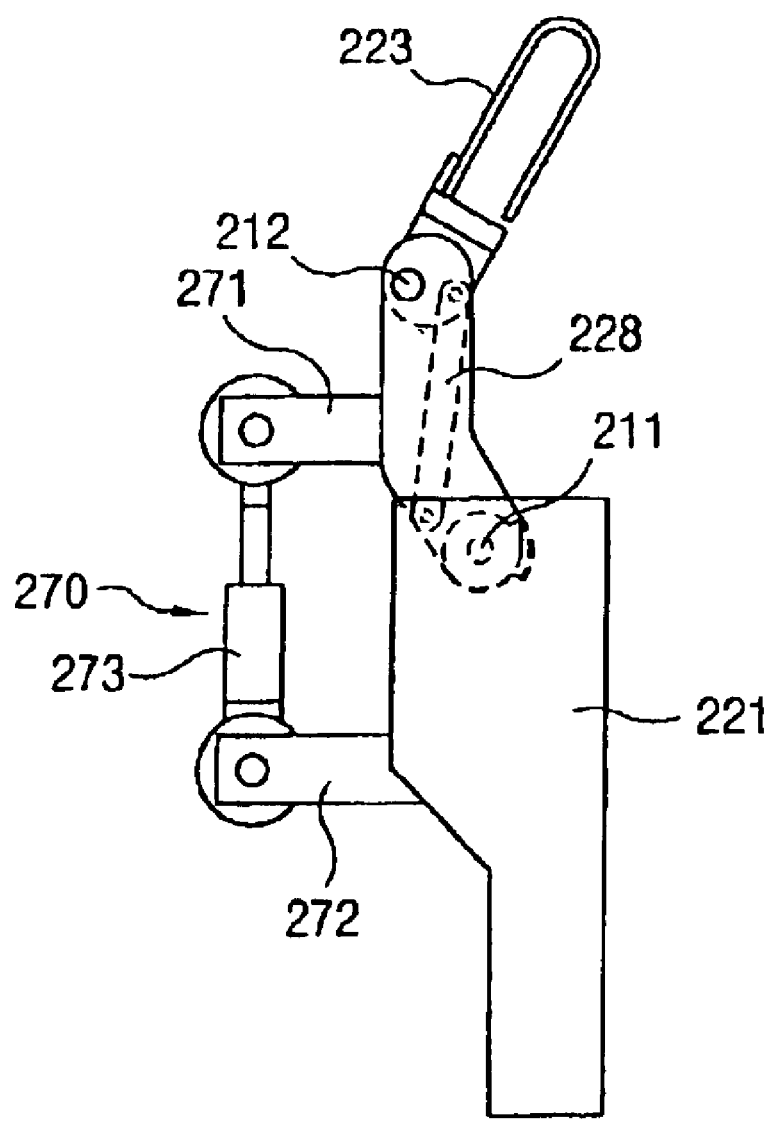
FIG. 8 is a side view of a moving finger in accordance with another embodiment of the present invention.

FIG. 8 is a side view of a moving finger in accordance with another embodiment of the present invention.

A moving finger 200B has the same construction as that shown in FIG. 4, except for the moving finger hooking unit.

The moving finger hooking unit 270 of the moving finger as shown in FIG. 8, includes a tension unit 273 of which one end is hinge-coupled with one side of the second phalanx 222 by a support member 271 and the other end is hinge-coupled with the same side of the first phalanx 221 by a support member 272.

The tensile force (a shrinkage force and an expansion force) of the tension unit 273 is transferred to the second phalanx 222, and thanks to the transferred tensile force, the hooking movement of the moving finger can be made according to the operation of the 4-joint link structure in the same manner. The tension unit 273 can be a pneumatic or hydraulic cylinder which makes a linear movement.

The moving finger 200C has the same construction as that of the moving finger 200B, except for the cam engaging jaw 451, the cam follower 452, the fixing member 453 and the wire guide 454. The moving finger 200C does not include the cam engaging jaw 451, the cam follower 452, the fixing member 453 and the wire guide 454.

Figure 9:
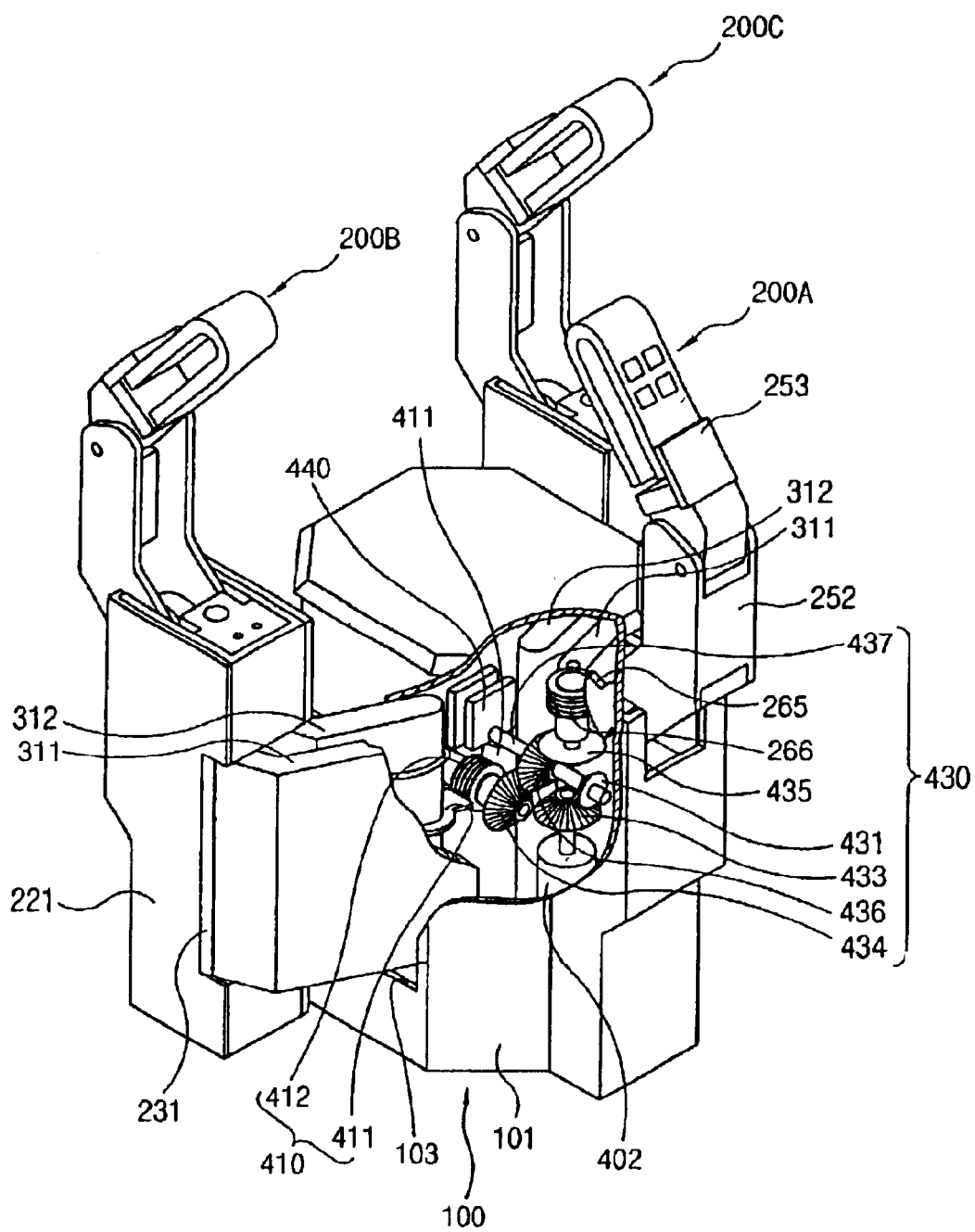
FIG. 9 is a partial cut perspective view of the robot hand of FIG. 3.

FIG. 9 is a partial cut perspective view of the robot hand of FIG. 3.

The fixed finger 200A includes an auxiliary link (not shown) of which one end is hinge-coupled with the first phalanx 251 and the other end is hinge-coupled with the third phalanx 253 so as to construct a 4-joint link forcing the third phalanx 253 to be moved dependent on the rotational movement of the second phalanx 252, and a fixed finger hooking unit 260 for rendering the fixed finger 200A to make a hooking movement.

The auxiliary link (not shown) is installed to cross a straight line connecting the first axes 241 and the second axes 242.

The fixed finger hooking unit includes a bending worm gear 265 formed at the second phalanx 252, a bending worm 266 moved in mesh with the bending worm gear 265, and a second driving motor 402 for driving the bending worm 266.

The fingers 200A–200C in the preferred embodiment of the present invention have such an effect that more than three phalanxes can make a hooking movement by using the 4-joint link structure, so that the fingers can be operated similar to the actual hand movement by using the less number of driving motors.

The first and second horizontal moving guides 311 and 312 are formed facing each other, of which one end is hinge-coupled with the hand base portion 100 and the other end is hinge-coupled with the moving fingers 200B and 200C, so as to form the parallelogram 4-joint link structure forcing the moving fingers 200B and 200C to be moved horizontally, respectively.

One end of the horizontal moving guides 311 and 312 is inserted into the opening 103 formed at the side 101 of the hand base portion 100 and one end is inserted into the opening 231 formed at the side of the first phalanx 221 of the moving fingers 200B and 200C. The horizontal moving guides 311 and 312 are installed for every moving finger 200B and 200C.

The horizontal moving unit includes a second driving motor 402 for driving the horizontal moving guides 311 and 312 to be rotated on the basis of the axis hinge-coupled with the hand base portion 100, and a horizontal movement driving force transfer unit installed between the second driving motor 402 and the horizontal moving guides 311 and 312 so that the horizontal moving guides 311 and 312 can be rotated by using the driving force of the second driving motor 402.

The second driving motor 402 is installed such that a driving shaft faces the upper surface inside the hand base portion 100.

The horizontal movement driving force transfer unit includes a moving worm gear 411 formed at the second horizontal moving guide 312 of the moving fingers 200B and 200C, a moving worm 412 installed to be in mesh with two moving worm gears 411 simultaneously, and a clutch unit 430 for driving the moving worm 412 by means of the second driving motor 402. The moving worm gear 411 can be formed at the first horizontal moving guide 311.

As noted above, because the moving fingers 200B and 200C make the hooking movement and the horizontal movement by the separate driving motor, the worm and the worm gear, no mechanical interference occurs between the hooking movement and the horizontal movement of the moving fingers 200B and 200C.

In addition, since the two moving fingers 200B and 200C are simultaneously moved horizontally by using one driving motor, the number of parts can be reduced and the horizontal movement can be implemented to be very similar to the actual human hand.

As well as making the moving worm 412 work by means of the second driving motor 402, the clutch unit 430 selectively transfers the driving force of the second driving motor 402 to the horizontal movement driving force transfer unit and the fixed finger hooking unit by virtue of the hooking movement of the moving finger 200B.

The clutch unit includes a third bevel gear 433 formed at the driving shaft of the second driving motor 402, a fifth bevel gear 435 formed facing the third bevel gear 433 and coaxially formed with the fixed finger bending worm 266, a fourth bevel gear 434 coaxially formed with the moving worm 412, a clutch shaft 437 installed parallel to a rotational shaft of the moving worm 412 and movable in the longitudinal direction between the third bevel gear 433 and the fifth bevel gear 435, a cam unit for changing the hooking movement of the moving finger 200B to a linear movement of the clutch shaft, a sixth bevel gear 436 formed at the clutch shaft 437 so as to be mesh with the third bevel gear 433 and the fifth bevel gear 435 simultaneously, and a first bevel gear 431 and a second bevel gear 432 formed at the clutch shaft 437 so as to be in mesh with the third bevel gear 433 and the fourth bevel gear 434, respectively, by virtue of the clutch shaft 437.

Figure 10:
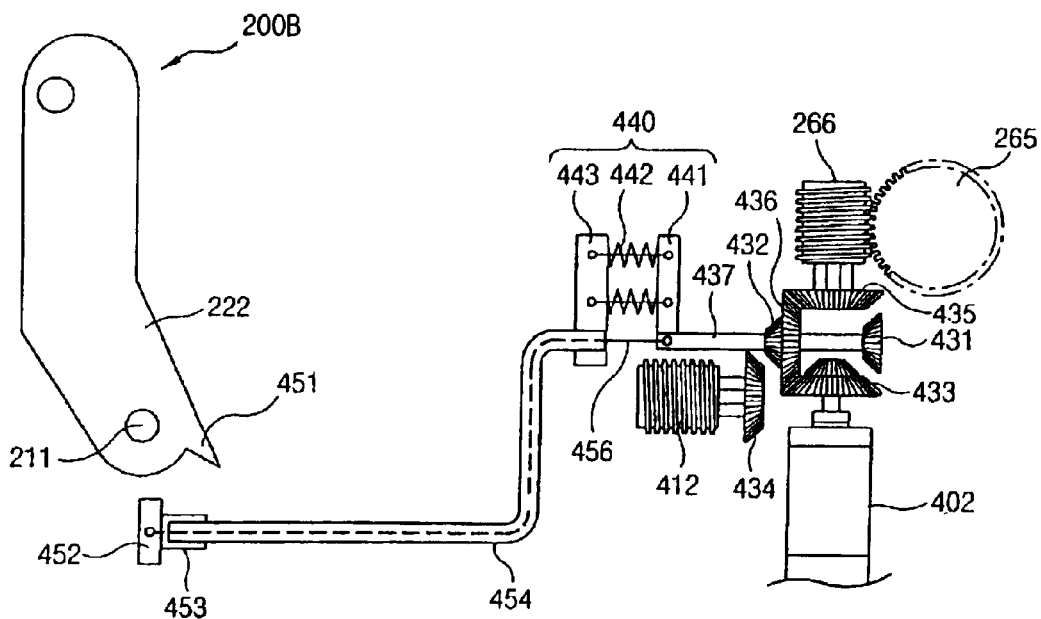
FIGS. 10 and 11 are conceptual view showing the construction of a clutch unit of FIG. 9.
Figure 11:
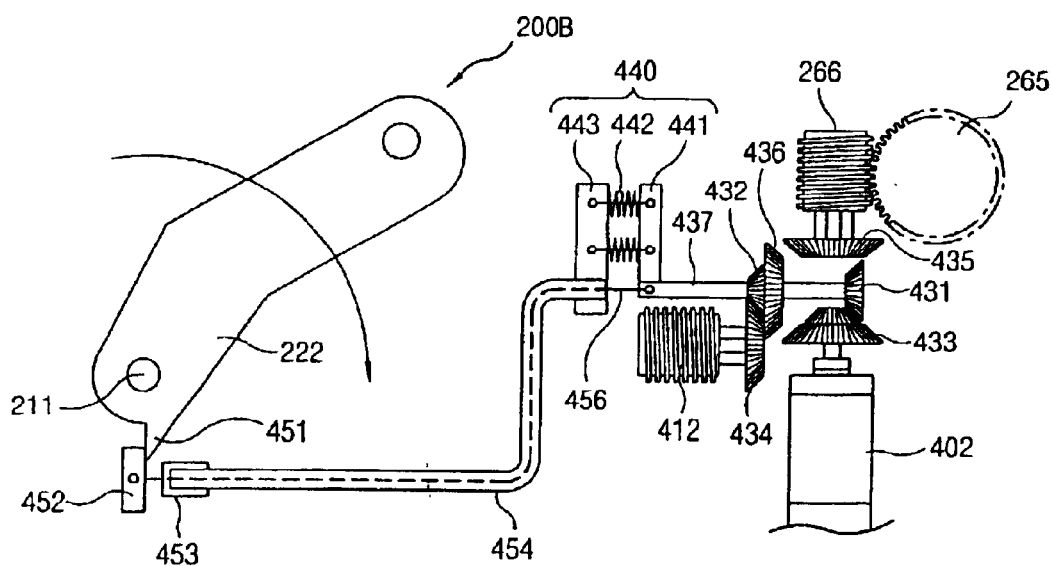

FIGS. 10 and 11 are conceptual view showing the construction of a clutch unit of FIG. 9.

The cam unit includes a cam engaging jaw 451 formed at the first axis 211 of the second phalanx 222 of the moving finger 200B, a cam follower 452 linearly moved as being engaged with the cam engaging jaw 451 according to the rotation of the cam engaging jaw 451, a wire 456 for connecting the cam follower 452 and the clutch shaft 437, a wire guide 454 covering the wire 456, a fixing member 453 for fixing the wire guide 454 inside the first phalanx 221 of the moving finger 200B, and an elastic member 440 formed between the clutch shaft 437 and the wire guide 454 in order to return the clutch shaft 437 to its original position in case that a load applied to the cam follower 452 disappears as the second phalanx 222 of the moving finger is rotated in the opposite direction.

The elastic member 440 is fixedly attached at the hand base portion 100 at one side thereof, and includes a fixed plate 443 to which the wire guide 454 is fixed, a moving plate 441 fixed at the clutch shaft 437, and a spring 442 installed between the fixed plate 443 and the moving plate 441.

One side of the clutch shaft 437 prevents the rotational movement of the shaft from being transferred to the elastic member 440 and the wire 456.

As shown in FIG. 10, in a clutch release state that the cam engaging jaw 451 is not in contact with the cam follower 452 (that is, in a state that the finger 200B is unfolded), the driving force generated from the second driving motor 402 is transferred to the sixth bevel gear 436 and the fifth bevel gear 435 through the third bevel gear 433 to drive the fixed finger bending worm 266 and the fixed finger bending worm gear 265 connected to the second phalanx 252 of the fixed finger 200A, whereby the fixed finger 200A can make a hooking movement.

Since the driving force is not transferred to the moving worm 412, the moving fingers 200B and 200C does not make a horizontal movement.

As shown in FIG. 11, in such a clutch operation state that the cam engaging jaw 451 is in contact with the cam follower 452 (that is, in a state that the moving finger 200B is bent at the maximum), the cam follower 452 pulls up the wire 456 inside the wire guide 454. Then, the clutch shaft 437 connected to the wire 456 is moved so that the sixth bevel gear 436 is separated from the fifth bevel gear 435 and the second bevel gear 432 is connected to the fourth bevel gear 434, and accordingly, the driving force of the second driving motor 402 is transferred to the moving worm 412, whereby the moving fingers 200B and 200C of FIG. 7 makes a horizontal movement.

When the moving finger 200B is unfolded, it returns to the clutch release state of FIG. 10 automatically by the elastic member, so that the fixed finger 200A makes a hooking movement.

In this manner, one of the hooking movement of the fixed finger 200A and the horizontal movement of the moving fingers 200B and 200C can be selected by controlling the movement of the moving finger 200B.

The hooking movement and the horizontal movement are made by means of the worm and the worm gear. Thus, while one movement is being made, the other movement is maintained at the previous state even if an external force is applied thereto owing to the characteristics of the worm gear.

Figure 12:
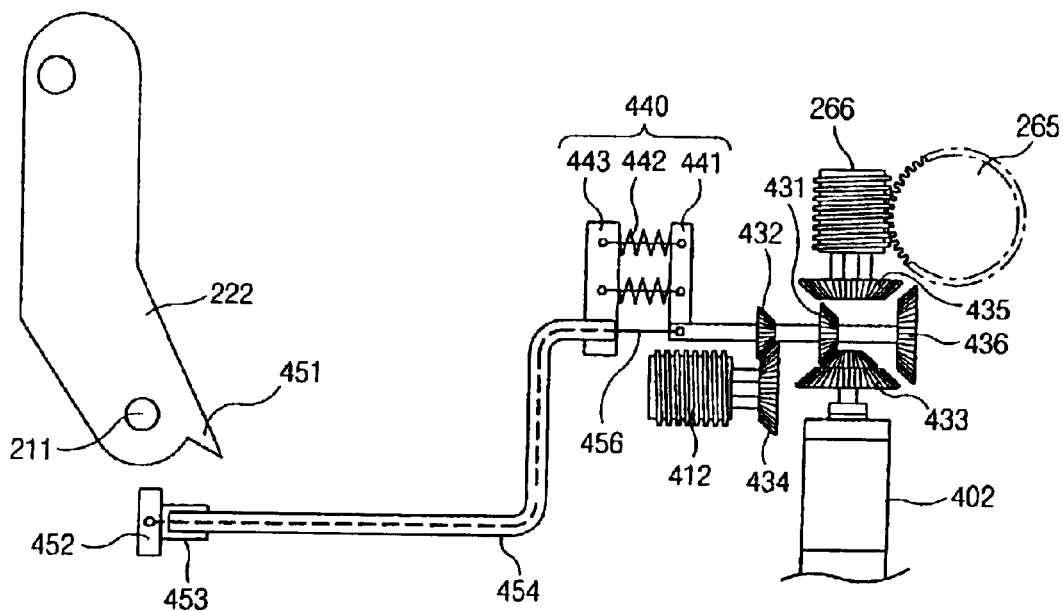
FIGS. 12 and 13 are conceptual view showing a clutch unit in accordance with another embodiment of the present invention.
Figure 13:
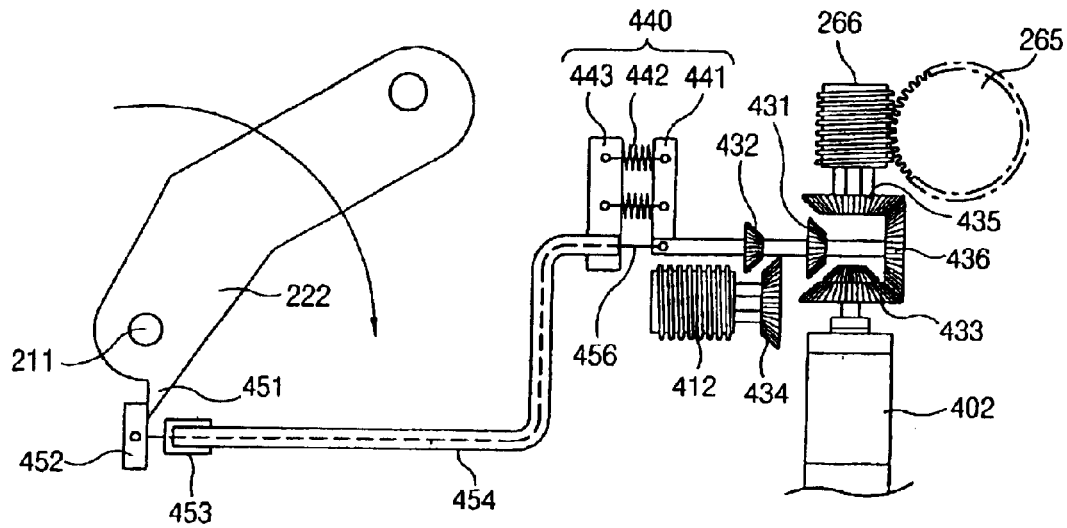

FIGS. 12 and 13 are conceptual view showing a clutch unit in accordance with another embodiment of the present invention, in which the mechanic operation is the opposite to that of FIGS. 10 and 11.

In a state that the moving finger 200B is unfolded, the first bevel gear 431 and the second bevel gear 432 are formed to be in mesh with the third bevel gear 433 and the fourth bevel gear 434 at the clutch shaft 437, and in case that the moving finger 200B is bent, the sixth bevel gear 436 is formed at the clutch shaft 437 so as to be simultaneously in mesh with the third bevel gear 433 and the fifth bevel gear 435 by the movement of the clutch shaft 437.

Other construction is the same as the clutch unit of FIG. 10.

With reference to FIG. 12, in a state that the clutch is not operated, the first bevel gear 431 is connected to the third bevel gear 433 and transfers the driving force of the driving motor 402 to the fourth bevel gear 434 through the second bevel gear 432, thereby horizontally moving the moving fingers.

With reference to FIG. 13, in a state that the clutch is being operated, the bevel gear 436 is connected to the third bevel gear 433 and transfers the driving force of the driving motor 432 to the fixed finger bending worm 266 through the fifth bevel gear 435, so that the fixed finger 200A makes a hooking movement.

That is, the horizontal movement of the fingers in the operation or non-operation of the clutch can be controlled by changing the combination of the bevel gears.

Figure 14:
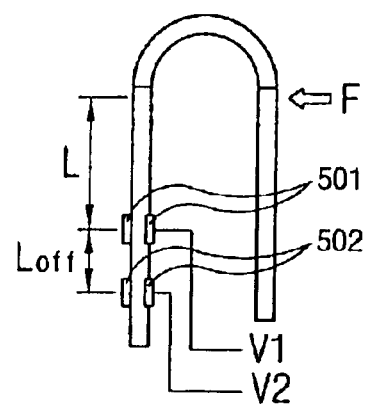
FIG. 14 is a detailed view of a distal end of the third phalanx of FIG. 4.

FIG. 14 is a detailed view of a distal end of the third phalanx of FIG. 4.

First four strain gages 501 are attached to the side forming the third phalanxes 223 and 253 so as to be connected as a first full bridge circuit, and second four strain gages 502 are attached at the same side but spaced as long as $L_{off}$ so as to be connected as a second full bridge circuit.

An output voltage ($V_1$) of the first full bridge circuit and an output voltage ($V_2$) of the second full bridge circuit are as follows:

$$V_1 = K_g e \left( \frac{FLh}{2EI} \right) K_a$$

$$V_2 = K_g e \left[ \frac{F(L + L_{off})h}{2EI} \right] K_a$$

In the above formulas, when $$K = K_g \frac{eh}{2EI} K_a,$$

'L' (the distance between a force applied to a phalanx and a measured point) and 'F' (a force applied to the phalanx) are as follows:

$$L = \frac{V_1 L_{off}}{V_2 - V_1}$$

$$F = \frac{V_2 - V_1}{K L_{off}}$$

wherein $K_g$=gage constant, 'e'=an input voltage of a bridge circuit, 'E'=Young's modulus of phalanx, 'h'=a thickness of section of phalanx, 'I'=an area moment of phalanx, and $K_a$=amp constant.

As stated above, the force working on the finger can be accurately predicted by measuring the two output voltages, and a sensitivity of the strain gage can be changed by adjusting the dimensions of the section of the first phalanx.

The calculating unit (not shown) calculates the force working on the robot hand finger from the output voltage of the strain gage and applies it to the controller (not shown) of the robot hand. Then, the controller controls the driving motors to control the hooking movement of the robot hand finger.

Figure 15:
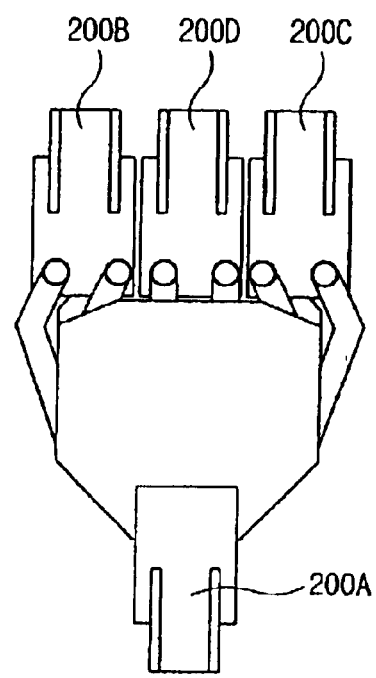
Figure 16:
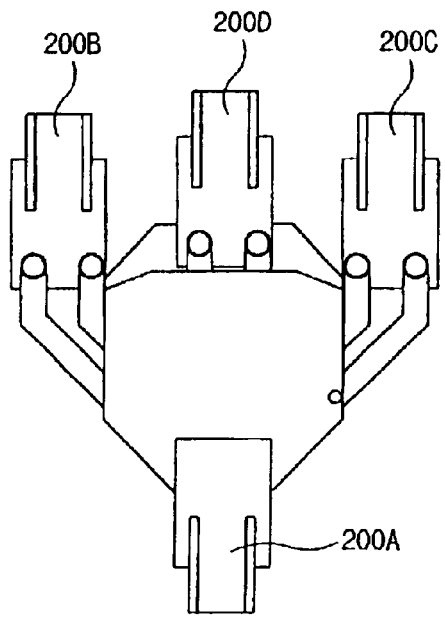

FIGS. 15 and 16 illustrate the structure of a robot hand in accordance with another embodiment of the present invention.

FIG. 15 shows a robot hand consisting of two fixed fingers 200A and 200D that can make a hooking movement and two moving fingers 200B and 200C that can make a horizontal movement and a hooking movement.

According to a hooking movement of either one of the moving fingers 200B and 200C which make a horizontal movement, the fixed fingers 200A and 200D make a hooking movement or the moving fingers 200B and 200C make a horizontal movement.

FIG. 16 is a plan view of the robot hand of FIG. 15 in a state of being unfolded.

Figure 17:
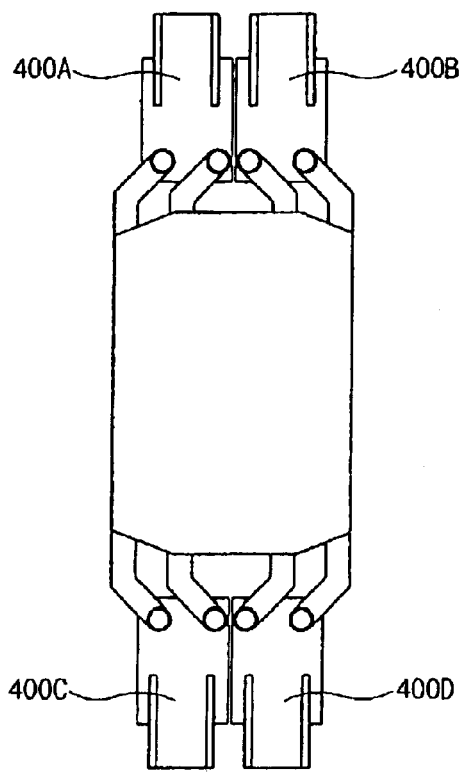
Figure 18:
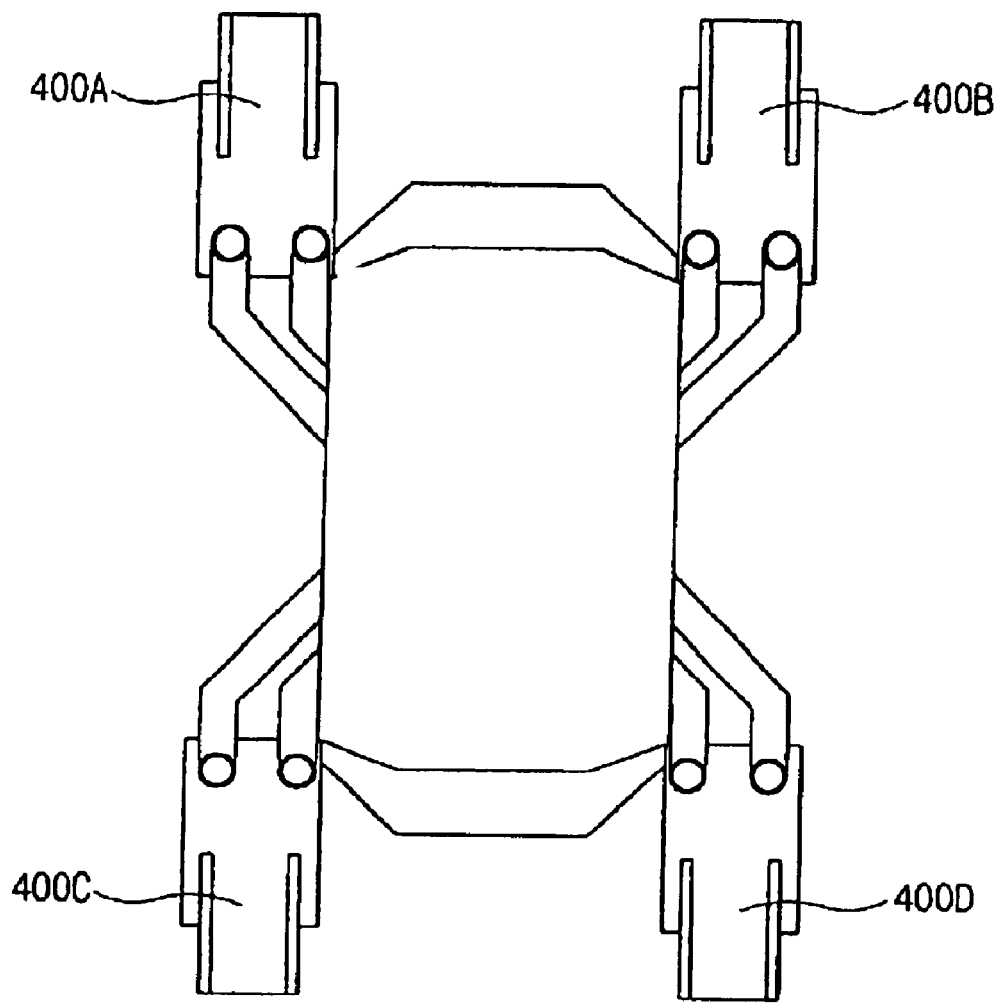

FIGS. 17 and 18 illustrate the structure of a robot hand in accordance with still another embodiment of the present invention, of which FIG. 17 shows a robot hand having four moving fingers 400A–400D which can make a horizontal movement and a hooking movement without a fixed finger.

As one or more moving fingers 400A–400D make a hooking movement, the remaining fingers make a horizontal movement.

FIG. 18 is a plan view of the robot hand of FIG. 17 in a state of being unfolded.

As so far described, the robot hand of the present invention has many advantages.

That is, for example, first, since the robot hand finger consisting of more than three phalanxes can make a hooking movement by using the 4-joint link structure, driving motors can be reduced in number to operate the robot hand just like an actual hand movement.

Second, by using the mechanical clutch structure, at least one of robot hand fingers can make a hooking movement by selectively using a driving motor which drives a horizontal movement of other robot hand finger, rather than using some other driving motor. Thus, the construction parts and size of the overall robot hand can be reduced.

In addition, thanks to the mechanical clutch structure, no mechanical interference occurs between the hooking movement of the finger which does not have the driving motor and the horizontal movement of other fingers.

Last, by attaching the strain gage to the robot hand, the force of the hand (that is, the grasping force) can be accurately predicted. Thus, a suitable and stable force can be applied to a working stuff.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A robot hand comprising:
    a robot hand base portion;
    two moving fingers installed facing each side of the hand base portion;
    first and second horizontal moving guides installed at each said moving finger facing each other, of which one end is binge-coupled at the hand base portion and the other end is hinge-coupled at the moving finger, so as to form a parallelogram 4-joint link structure to force the moving finger to move in a direction extending along a side of the moving finger;
    a horizontal moving unit for making the horizontal moving guides to be rotated on the basis of a shaft hinge-coupled at the hand base portion, said horizontal moving unit comprising:
    a second driving motor for driving the horizontal moving guides to be rotated centering around a shaft hinge-coupled with the hand base portion; and a horizontal movement driving force transfer unit installed between the second driving motor and the horizontal moving guides so that the horizontal moving guides are rotated by using a driving force of the second driving motor, said horizontal movement driving force transfer unit comprising two moving worm gears formed at one of the first and second horizontal moving guides respectively coupled to the two moving fingers, two moving worms installed to be simultaneously in mesh with the two moving worm gears, and a clutch unit for driving the moving worms by means of the second driving motor.

2. The robot hand of claim 1, wherein the clutch unit comprises:

a fourth bevel gear coaxially formed with a rotational shaft of the moving worm;

a second bevel gear installed to be in mesh with the fourth bevel gear;

a first bevel gear coaxially installed with the second bevel gear; and a third bevel gear installed to be in mesh with the first bevel gear and fixed at a driving shaft of the second driving motor.

3. The robot hand of claim 1, wherein four moving fingers are installed, facing each other two by two, and the first and second horizontal moving guides are installed at each moving finger.

4. A robot hand comprising:

a robot hand base portion;

a moving finger installed at the side of the hand base portion;

first and second horizontal moving guides installed facing each other, of which one end is hinge-coupled at the hand base portion and the other end is hinge-coupled at the moving finger, so as to form a parallelogram 4-joint link structure to force the moving finger to move in a direction extending along a side of the moving finger;

a second driving motor for making the horizontal moving guides to be rotated on the basis of a shaft hinge-coupled at the hand base portion;

a horizontal movement driving force transferring unit installed between the second driving motor and the horizontal moving guides so as for the horizontal moving guides to be rotated by using a driving force of the second driving motor;

a moving finger hooking unit to allow the moving finger to make a hooking movement;

a fixed finger having a first phalanx fixed at the side of the hand base portion and a second phalanx hinge-coupled at the end of the first phalanx by a first joint;

a fixed finger hooking unit installed between the second driving motor and the fixed finger to allow the fixed finger to make a hooking movement by using the driving force of the second driving motor; and a clutch unit selectively transferring the driving force of the second driving motor to one of the horizontal movement driving force transferring unit and the fixed finger hooking unit by the hooking movement of the moving finger.

5. The robot hand of claim 4, wherein the moving finger includes a first phalanx hinge-coupled with the first and second horizontal moving guides so that the binge shaft faces in the longitudinal direction of the moving finger, and a second phalanx binge-coupled with the distal end of the first phalanx by a first axis;

the horizontal movement driving force transfer unit includes a moving worm gear formed at either one of the first and second horizontal moving guides and a moving worm formed to be in mesh with the moving worm gear;

the fixed finger hooking unit includes a fixed finger bending worm gear formed at the second phalanx of the fixed finger and a fixed finger bending worm installed to be in mesh with the fixed finger bending worm gear, and the clutch unit includes a third bevel gear formed at a driving shaft of the second driving motor, a fifth bevel gear installed facing the third bevel gear and coaxially formed with the fixed finger bending worm, a fourth bevel gear coaxially formed with the moving worm, a clutch shaft parallel to a rotational shaft of the moving worm and installed movable in a longitudinal direction between the third bevel gear and the fifth bevel gear, a cam unit for changing the hooking movement of the moving finger to a linear movement of the clutch shaft, a sixth bevel gear formed at the clutch shaft so as to be simultaneously in mesh with the third bevel gear and the fifth bevel gear, and first and second bevel gears formed at the clutch shaft so as to be in mesh with the third bevel gear and the fourth bevel gear according to movement of the clutch shaft.

6. The robot hand of claim 5, wherein the cam unit comprises:

a cam engaging jaw formed at the second phalanx of the moving finger;

a cam follower making a linear movement in association with the cam engaging jaw by the hooking movement of the second phalanx of the moving finger;

a wire connecting the cam follower and the clutch shaft;

a wire guide covering the wire and fixed at the horizontal moving guide; and an elastic member installed between the wire guide and the clutch shaft.

7. The robot hand of claim 6, wherein the moving fingers, the first and second horizontal moving guides, the moving worm gears are installed to be symmetrical to each other, and the moving worm is simultaneously in mesh with the moving worm gears.

8. The robot hand of claim 7, wherein the moving finger and the fixed finger comprises:

a third phalanx of which one end is hinge-coupled with the distal end of the second phalanx by a second axis; and an auxiliary link of which one end is hinge-coupled with the first phalanx and the other end is hinge-coupled with the third phalanx so as to cross a straight line connecting the first axis and the second axis, in order to construct a 4-joint link forcing the third phalanx to be moved dependent on a rotational movement of the second phalanx.

9. The robot hand of claim 8, wherein the moving finger hooking unit comprises:

a bending worm gear formed at the second phalanx;

a bending worm coupled to be in mesh with the bending worm gear; and a first driving motor for driving the bending worm.

10. The robot hand of claim 9, further comprising:

a strain gage installed at the third phalanxes of the moving finger and the fixed finger;

a calculating unit for calculating a strength of a force applied to the third phalanx by measuring a voltage value form the strain gage; and a controller for controlling the first driving motor and the second driving motor by using the strength of the force calculated by the calculating unit.

11. The robot hand of claim 8, wherein the moving finger hooking unit includes a cylinder of which one end is connected to the first phalanx and the other end is connected to the second phalanx.

12. The robot hand of claim 11, further comprising:

a strain gage installed at the third phalanxes of the moving finger and the fixed finger;

a calculating unit for calculating a strength of a force applied to the third phalanx by measuring a voltage value form the strain gage; and a controller for controlling the cylinder and the second driving motor by using the strength of the force calculated by the calculating unit.

13. A robot hand finger comprising:

a first phalanx;

a second phalanx of which one end is hinge-coupled with the distal end of the first phalanx by a first axis;

a third phalanx of which one end is hinge-coupled with the distal end of the second phalanx by a second axis;

an auxiliary link of which one end is hinge-coupled with the first phalanx and the other end is hinge-coupled with the third phalanx so as to cross a straight line connecting the first axis and the second axis, in order to construct a 4-joint link which forces the third phalanx to be moved dependent on a rotational movement of the second phalanx; and a finger hooking unit for rotating the second phalanx centering around the first axis, said finger hooking unit comprising:

a bending worm gear formed at the second phalanx;

a bending worm moved in mesh with the bending worm gear; and a first driving motor for driving the bending worm.

14. The robot hand finger of claim 13, wherein the finger hooking unit includes a tension unit of which one end is connected to the first phalanx and the other end is connected to the second phalanx.

15. A robot hand finger comprising:

a first phalanx;

a second phalanx of which one end is hinge-coupled with the distal end of the first phalanx by a first axis;

a third phalanx of which one end is hinge-coupled with the distal end of the second phalanx by a second axis;

an auxiliary link of which one end is hinge-coupled with the first phalanx and the other end is hinge-coupled with the third phalanx so as to cross a straight line connecting the first axis and the second axis, in order to construct a 4-joint link which forces the third phalanx to be moved dependent on a rotational movement of the second phalanx; and a finger hooking unit for rotating the second phalanx centering around the first axis, said finger hooking unit including a tension unit of which one end is connected to the first phalanx and the other end is connected to the second phalanx.

16. The robot hand finger of claim 15, further comprising a connector of which one end is fixed at the first phalanx and the other end is hinge-coupled with the auxiliary link.

* * * * *